United States Patent
Bueno et al.

[11] Patent Number: 6,162,050
[45] Date of Patent: Dec. 19, 2000

[54] FURNACE FOR THE DIRECT REDUCTION OF IRON OXIDES

[75] Inventors: Henry Rafael Bueno; David Rabascall, both of Puerto Ordaz, Venezuela; Gianpietro Benedetti, Campoformido, Italy

[73] Assignee: Danieli & C. Officine Meccaniche SpA, Italy

[21] Appl. No.: 09/457,713

[22] Filed: Dec. 10, 1999

[30] Foreign Application Priority Data

Dec. 11, 1998 [IT] Italy .................................. UD98A0213

[51] Int. Cl.[7] ........................................................ C21B 11/02
[52] U.S. Cl. ................................. 432/98; 75/490; 75/495
[58] Field of Search .......................... 432/98, 100, 101, 432/117, 152; 75/489, 490, 495; 222/219, 226

[56] References Cited

U.S. PATENT DOCUMENTS

| | | | |
|---|---|---|---|
| 2,862,808 | 12/1958 | De Jahn | 75/490 |
| 3,749,386 | 7/1973 | Beggs et al. | 266/140 |
| 4,046,557 | 9/1977 | Beggs | 75/490 |
| 4,252,299 | 2/1981 | LoBue | 75/490 |
| 4,674,198 | 6/1987 | Huttlin | 432/117 |
| 4,826,429 | 5/1989 | Niems . | |
| 5,296,015 | 3/1994 | Becerra-Novoa . | |

FOREIGN PATENT DOCUMENTS

19625127  12/1997  Germany .

Primary Examiner—Denise L. Ferensic
Assistant Examiner—Gregory A. Wilson
Attorney, Agent, or Firm—Antonelli, Terry, Stout & Kraus, LLP

[57] ABSTRACT

Gravitational type furnace for the direct reduction of mineral iron comprising a median reaction zone (14) in which the reactions to reduce the mineral iron occur, means (11) to feed the mineral iron to said reaction zone (14), means (18) to introduce a mixture of reducing gas into said reaction zone (14) and means (15) to discharge the reduced metal iron, said discharge means comprising at least two extremities (15a–15c), shaped like a cone or a truncated cone, with the taper facing downwards, each of which being provided with a corresponding lower aperture (16a–16c) through which said reduced metal iron can be selectively discharged in a controlled and independent manner.

14 Claims, 2 Drawing Sheets

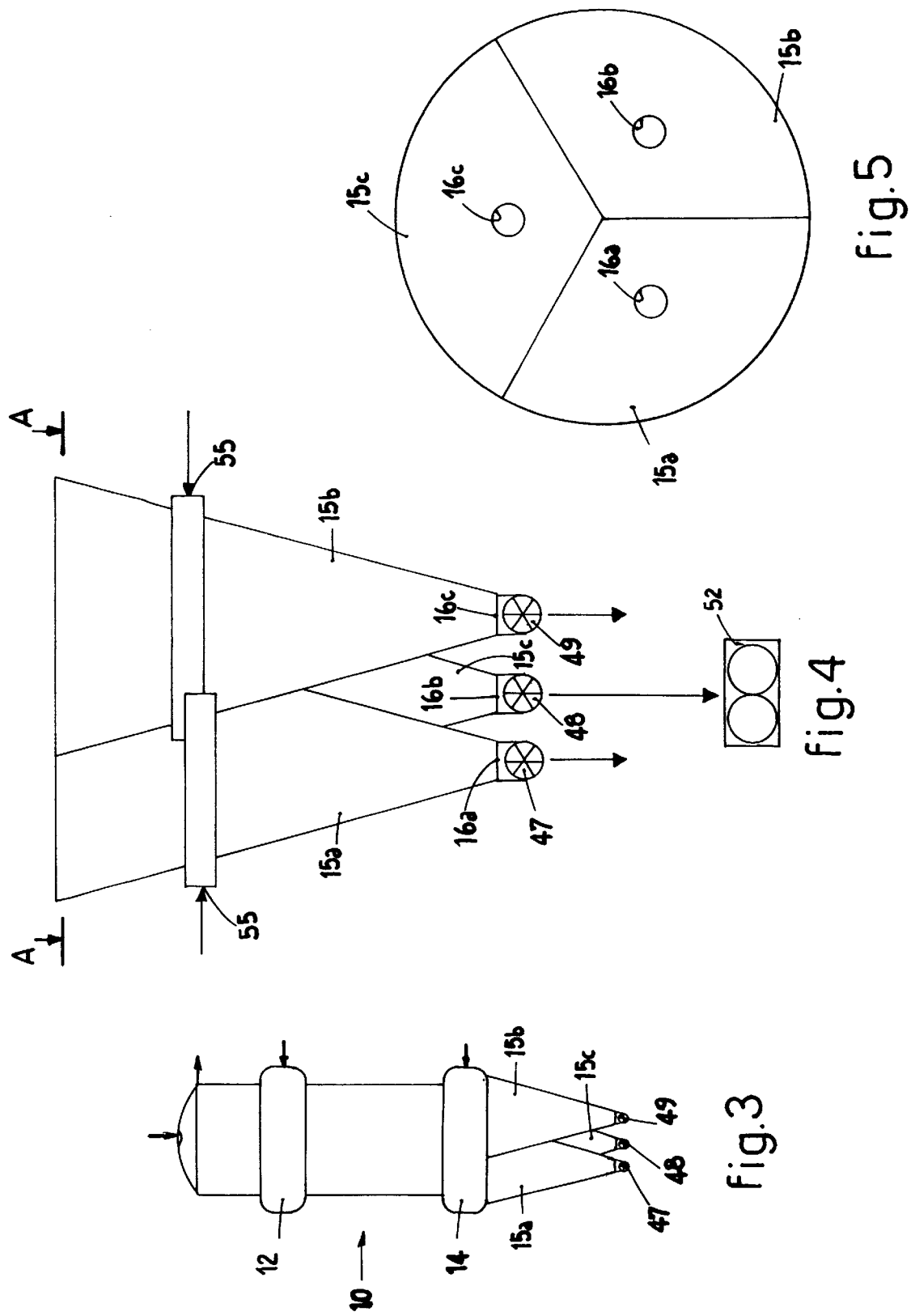

FURNACE FOR THE DIRECT REDUCTION OF IRON OXIDES

FIELD OF THE INVENTION

This invention concerns a furnace for the production of metal iron by means of the direct reduction of mineral iron, where the iron is present in the form of oxides. The furnace is of the gravitational type and is provided with an upper aperture through which the mineral iron, coarse or in the form of pellets, is introduced, and a lower outlet from which the directly reduced iron (DRI) is removed. At least a lateral aperture is provided in the furnace to introduce reducing gas. The lower outlet of the furnace is of the multiple type to encourage the selective and simultaneous discharge of several types of product, that is both hot and cold, so that it can subsequently be stored, sent to a melting furnace to produce liquid steel, or converted into hot briquetted iron (HBI).

BACKGROUND OF THE INVENTION

The state of the art includes furnaces for direct reduction processes wherein hydrocarbons are injected into the current of reducing gas to allow the reaction of reforming the methane in the furnace with the $H_2O$ and $CO_2$ in the gas; there are also furnaces for direct reduction processes wherein hydrocarbons having C>5 are injected directly into the furnace in the zone between the injection of reducing gas and the upper outlet of the exhaust gas.

The following patent documents disclose other different types of furnaces for direct reduction processes of mineral iron:

U.S. Pat. No. 3,749,386, U.S. Pat. No. 3,816,101, U.S. Pat. No. 4,046,557, U.S. Pat. No. 4,536,213, U.S. Pat. No. 4,752,329, U.S. Pat. No. 5,064,467, U.S. Pat. No. 5,078,788, U.S. Pat. No. 5,387,274, U.S. Pat. No. 5,407,460.

The state of the art also includes gravitational type furnaces, or shaft furnaces, with a vertical and gravitational flow of the material which is subsequently sent, with a closed system of pneumatic transport in an inert atmosphere, to the melting furnace.

The Applicant is not aware of any furnaces for the production of metal iron by means of direct reduction provided with a multiple outlet or star outlet which can encourage the simultaneous but differentiated discharge of several types of product.

SUMMARY OF THE INVENTION

The furnace to produce metal iron by the direct reduction of iron oxides according to the invention is set out and characterized in the main claim, while the dependent claims describe other innovative characteristics of the invention.

The furnace according to the invention is of the gravitational or shaft type, wherein both the material and the gas are fed continuously, so as to create a vertical and gravitational flow of the material and so that the direct reduction of the mineral occurs. The material can be discharged from the reactor cold or preferably hot, to be sent subsequently to a melting furnace so that it can be converted into hot bricquetted iron (HBI) or cooled and converted into directly reduced iron (DRI).

The reduction furnace is equipped with means to feed the mineral iron and means to discharge the reduced metal iron, and is equipped with at least an inlet collector, arranged laterally, to inject the reducing gas in correspondence with one or more reduction zones inside the furnace.

The reducing gas sent to the reactor contains hydrocarbons injected into the current.

The direct reduction of the iron oxides is achieved in one or more continuous stages inside the reduction reactor.

Moreover, the inlet temperature of the reducing gas in the different injection zones may be regulated independently by injecting $O_2$ before it enters the reduction reactor. The final inlet temperature is more than 760° C. and is preferably between 1000° C. and 1150° C. Whether there is a single inlet or multiple inlets, for example two, the flow of reducing gas can be regulated autonomously and independently, both in delivery and in composition since oxygen can be added to raise the temperature, generating a change in the oxidation level of the gas from typical values of 0.04–0.08 to 0.06–0.15.

By oxidation level of the reducing gas, the following ratio is intended:

$$Nox=(H_2O+CO_2)/(H_2O+CO_2+H_2+CO).$$

It is also provided to inject natural gas into the current of gas entering the furnace to compensate for the greater oxidation of the gas and in such a manner that the reduction reaction of the iron oxide with the gaseous hydrocarbons of the $CH_4$ type and higher hydrocarbons occurs in the inner zone of the reduction furnace containing metal iron together with the iron oxides.

The reducing gas enters the median zone of the furnace and acts in such a manner that the reduction reaction of the iron oxides to metal iron occurs.

In accordance with one characteristic of the invention, the lower outlet of the furnace is of the multiple type, to encourage the simultaneous discharge of several types of product.

The multiple outlet encourages the distribution of the reducing gas inside the furnace and a better distribution of the material inside the furnace, preventing preferential channels which occur in furnaces with a single outlet cone.

In furnaces with a single outlet cone, in fact, the finer material tends to arrange itself in the middle, and this encourages the reducing gas to flow in the outer part, so that it reduces the iron oxides nearest the wall more, and has difficulty in penetrating the core of the solid bed of material, and thus the iron oxides are reduced with more difficulty and in any case the process takes a longer time.

The whole reaction zone of the furnace works at a more uniform temperature, and especially at a constant temperature along the whole section of the reduction furnace, encouraging a higher speed of reaction, with consequent reduction of consumption and increase in productivity.

The extractors are very flexible to use, and by varying the outlet flow, the formation of bridges in the furnace is prevented.

The reduced metal iron is discharged preferably hot through the multiple outlet, preferably with 3 or 4 cones, which are able to discharge the material simultaneously or singly.

The big advantage of being able to discharge simultaneously from several points is that it is possible to regulate the flow of material at outlet by varying the speed of extraction of the individual discharge systems.

Another advantage is that this movement helps to make the material descend from the upper zone in a uniform manner, with a perfect mixing of the larger particles and the finer particles, creating a continuous movement of the material and reducing the possibility of the material sticking.

A further, considerable advantage is that it is also possible to simultaneously discharge hot material destined for different uses: one part can be introduced directly into a melting furnace, for final melting; one part can be briquetted; and one part can be cooled outside in a silo and sent for storage.

Another advantage is that it is in any case possible to discharge all the hot material into the melting furnace to produce steel, reducing energy consumption to a minimum.

All the material can also be briquetted hot or cold and stored.

Unlike conventional furnaces equipped with a single outlet, the possibility of having several outlets allows to empty the furnace in the event that one of the outlets is blocked. In this case it is possible to act on the other outlets to empty the furnace almost completely, except for the part of the cone with the blocked outlet; once the rest of the furnace has been emptied it is possible to carry out maintenance work more easily, and to unblock the material. This operation is not possible in conventional furnaces.

In the event that the reducing gas enters the furnace through at least two lateral inlets, the direct reduction of the iron oxides is achieved in two different contiguous stages inside the reduction reactor.

In a first stage, defined as the pre-heating and pre-reduction stage, the fresh iron oxides, that is, those just introduced into the furnace, come into contact with a mixture of reducing gas consisting of partly burnt gas arriving from the underlying part of the furnace, and fresh hot gas, that is to say, introduced from outside, arriving from a collector which brings fresh reducing gas and possibly $CH_4$ or other natural gas. This first stage occurs in a corresponding first zone arranged in the highest part of the furnace.

In a second stage, the reduction stage proper, the complete reduction of the iron oxides takes place, due to the action on said oxides, which are already partly reduced in the first stage, of a mixture of reducing gas based on $H_2$ and CO and at least a hydrocarbon, preferably natural gas, injected into the median zone of the reduction reactor together with the current of reducing gas or directly into the reduction furnace. This second stage occurs in a corresponding second zone arranged below the first zone.

The first reducing gas inlet is located at a determined distance (x) with respect to the second inlet, which is located in the median part of the furnace, in correspondence with the second reduction zone. This distance (x) is suitably between 1 and 6 meters, preferably between 2 and 4 meters to encourage reactions between the reducing gas and the iron oxides in the most suitable zone.

The first gas inlet also has the function of thrusting the gases arriving from the second reduction zone towards the center of the furnace, so as to create a uniform distribution of gas in the section of the reactor.

In this way, moreover, the iron oxides arrive in the reduction zone already partly reduced, encouraging the completion of the final reduction reaction from FeO to Fe.

The gas emerging from the reduction reactor is partly recircled and partly used as fuel.

The gas fed to the reduction reactor consists of a mixture of natural gas, gas recircled by the reactor itself and reformed gas.

BRIEF DESCRIPTION OF THE DRAWINGS

These and other characteristics of the invention will become clear from the following description of a preferred form of embodiment, given as a non-restrictive example, with reference to the attached drawings wherein:

FIG. 3 shows a second variant of a furnace according to the invention;

FIG. 4 shows an enlarged detail of another variant of a furnace according to the invention; and FIG. 5 is a section along the line from A to A of FIG. 4.

DETAILED DESCRIPTION OF SOME PREFERRED FORMS OF EMBODIMENT

Figure 1:
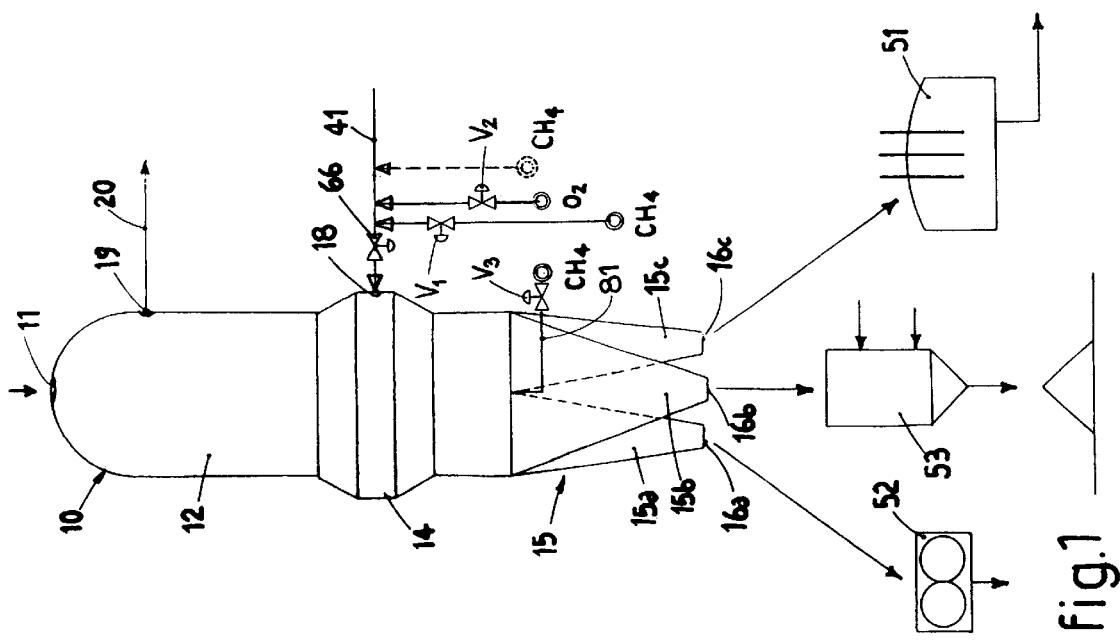
FIG. 1 is a schematic view of a furnace for the direct reduction of iron oxides according to the invention.

With reference to FIG. 1, a furnace 10 for the direct reduction of iron oxides according to the invention comprises an upper mouth 11 for feeding material from above, through which the mineral (iron oxides) is suitable to be introduced, a first upper pre-heating and pre-reducing zone 12, a second zone, or median zone 14 wherein the final reduction reaction of the iron oxides takes place, and a lower zone or discharge zone 15.

In accordance with one characteristic of the invention, the discharge zone 15 has three lower extremities, preferably shaped like a cone or a truncated cone 15a, 15b and 15c, with the taper facing downwards, each provided with a lower aperture 16a, 16b and respectively 16c, through which the directly reduced iron (DRI) can be selectively discharged in a controlled and independent manner. Consequently, the product can also be discharged singly, for example in the event of an emergency.

The iron-based metal oxides are introduced into the furnace 10 in the form of pellets or coarse mineral of an appropriate size; the iron contained therein is normally between 63% and 68% in weight.

At the end of the process according to the invention, the iron contained in the reduced material emerging from the furnace 10 is normally between 80% and 90% in weight.

In correspondence with the median zone 14 of the furnace 10 there is an inlet 18 through which a mixture of reducing gas, arriving from a conduit 41, is suitable to be introduced. The delivery of the reducing gas is controlled by means of a regulation valve 66. The furnace 10 is provided in its upper part with an aperture 19 through which the exhaust gas exits. The exhaust gas normally has the following characteristics: composition: $H_2$=20–41%, CO=15–28%, $CO_2$=12–25%, $CH_4$=2–10%, $N_2$=0–8%, $H_2O$=2–15%; temperature between 500° C. and 700° C.; oxidation level between 0.3 and 0.50, preferably between 0.40 and 0.45; a reduction ratio R between 1 and 1.8, where reduction ratio $$R=(H_2+CO)/(H_2O+CO_2).$$

The exhaust gas emerging from the furnace 10 is sent through a conduit 20 to a recycling plant, not shown in the drawings, which also provides to prepare the reducing gas arriving in the conduit 41.

Air or oxygen-enriched air or pure oxygen and natural gas, for example methane ($CH_4$) is injected into this conduit 41 in variable percentages.

Valves V1–V3 are located in correspondence with the different conduits of the plant so that the flow can be selectively controlled.

The resulting mixture of gas is regulated in every component and enters the reduction furnace 10 at a temperature of between 800° C. and 1150° C.

The reactions involved in the reduction zone 14 are as follows:

$FeO+CH_4=Fe+2H_2+CO$ $3Fe+CH_4=Fe_3C+2H_2$ $Fe_3C+H_2O=3Fe+CO+H_2$

Simultaneously, in the same zone 14, the following reduction reactions with hydrogen and carbon monoxide occur:

$$FeO+H_2 \; Fe+H_2O$$

$$FeO+CO \; Fe+CO_2$$

The consequence of these endothermic reactions is that the temperature of the gas in the reduction zone decreases from 950° C.–1150° C. to 700° C.–900° C., while a higher reaction temperature than in conventional furnaces is still maintained, and the gas leaving the reduction zone 14 has an oxidation level of between 0.15 and 0.35 and a reducing power of between 1.1 and 2.8.

The reactions involved in the pre-reducing zone 12 are as follows:

$$Fe_2O_3+H_2=2FeO+H_2O$$

$$Fe_2O_3+CO=2FeO+CO_2$$

Gas containing natural gas may also be introduced into the lower zone 15, to control the final carbon in the hot reduced iron to values of between 1% and 5%.

The material exits hot from the furnace 10, at a temperature of between 600° C. and 800° C., and can take any of the three routes 15a, 15b or 15c.

In this way, for example, one part may be introduced directly into a melting furnace 51, such as an electric arc furnace, for final melting; one part may be briquetted by means of a briquetting machine 52; and one part may be cooled externally in a silo 53 and sent for storage.

In accordance with one characteristic of the furnace 10, each lower extremity 15a, 15b and 15c is provided with a rotary valve 47, 48 and respectively 49 (FIGS. 3 and 4), suitable to regulate the flow of material exiting the furnace 10.

Moreover, according to a variant as shown in FIG. 4, each lower extremity 15a, 15b and 15c is provided with an inlet 55 through which a cooling element can be introduced, and therefore it is possible for products to exit from the outlets 16a, 16b and 16c at a varying temperature, or even already cooled, to be sent directly for storage.

Figure 2:
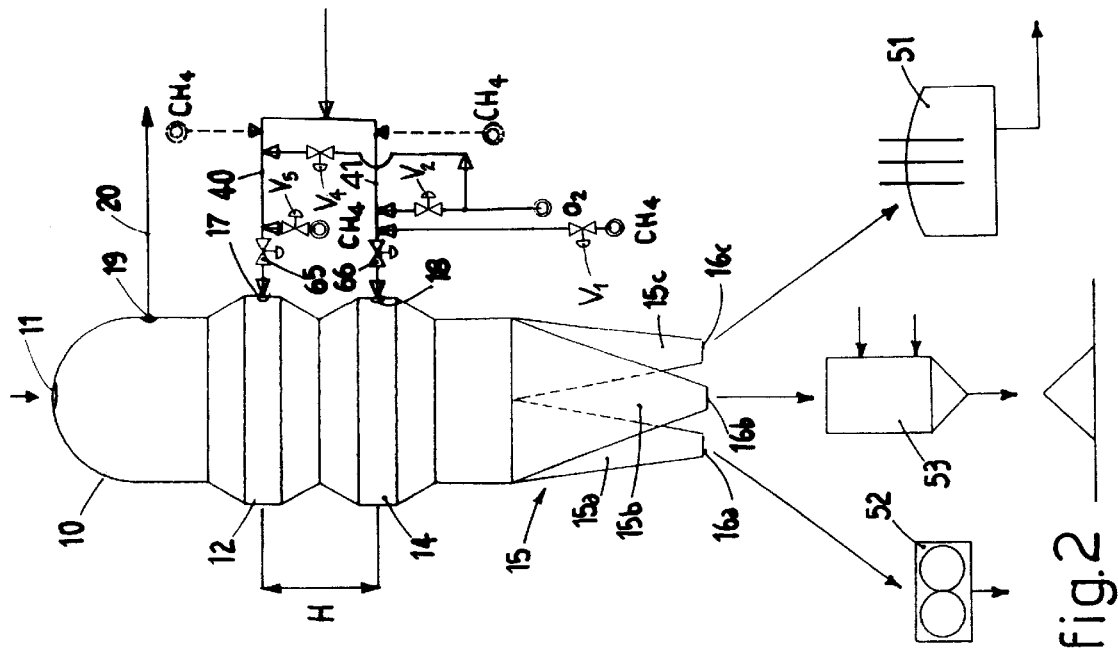
FIG. 2 shows a first variant of a furnace according to the invention.

In another variant as shown in FIG. 2, instead of having a single inlet 18 in correspondence with zone 14 where the mixture of reducing gas is injected, the furnace 10 is provided with a second inlet 17, arranged in correspondence with the pre-reducing zone 12, through which a mixture of reducing gas can be introduced arriving from a conduit 40, the delivery of which is controlled by means of a regulation valve 65.

Valves V1–V2 and valves V4–V5 are located in correspondence with the different conduits of the plant so that the flow can be selectively controlled.

According to another variant, as shown in FIGS. 1 and 2 with a line of dashes, the methane is added in the conduits 40 and 41 before the air, the oxygen-enriched air or the pure oxygen, according to operating requirements and the temperature of the reducing gas.

According to another variant, in the zone of intersection between the extremities 15a, 15b and 15c, it is possible to introduce, through a conduit 81, gaseous hydrocarbons such as natural gas and advantageously methane ($CH_4$) to partly cool the hot material. The heated methane rises towards the reduction zone 14 and cooperates in the direct reduction of the iron oxide into metal iron, improving the efficiency of the reduction process, the final metallization of the product and also productivity.

The reactions involved in this step are as follows:

$$3Fe+CH_4=Fe_3C+2H_2$$

$$FeO+CH_4=Fe+CO+2H_2$$

and therefore the methane helps to reduce the iron oxides and also generates even more reducing gas, improving the total reducing power of the mixture of gas injected into the furnace.

It is obvious that modifications and additions can be made to the furnace 10 for the direct reduction of mineral iron as described heretofore, but these shall remain within the field and scope of the invention.

For example, it is obvious that there may be only two, or more than three, extremities of the lower zone 15.

What is claimed is:

1. Gravitational type furnace for the direct reduction of mineral iron comprising a reaction zone (14) in which the reactions to reduce the mineral iron occur, means (11) to feed the mineral iron to said reaction zone (14), means (18) to introduce a mixture of reducing gas into said reaction zone (14) and means (15) to discharge the reduced metal iron, the furnace being characterized in that said discharge means comprise at least two extremities (15a–15c), shaped like a cone or a truncated cone, with the taper facing downwards, each of which provided with a corresponding lower aperture (16a–16c) through which said reduced metal iron can be selectively discharged in a controlled and independent manner.

2. Furnace as in claim 1, characterized in that at least two systems to convey said reduced metal iron are provided in correspondence with said lower apertures (16a–16c) to selectively convey said reduced metal iron to at least two distinct zones (51–53) downstream of said extremities (15a–15c), wherein one of said zones (53) is used for the cooling and temporary storing of said reduced metal iron and the other zones (51, 52) are suitable to use the hot load of said reduced metal iron.

3. Furnace as in claim 2, characterized in that at least one of said conveyor systems is suitable to transport said reduced metal iron to a briquetting station (52).

4. Furnace as in claim 2, characterized in that at least one of said conveyor systems is suitable to transport said reduced metal iron to a loading system for an electric arc furnace (51).

5. Furnace as in claim 2, characterized in that at least one of said conveyor systems is suitable to transport said reduced metal iron to means (53) used for the cooling and temporary storing of said reduced metal iron.

6. Furnace as in claim 1, characterized in that means to cool said reduced metal iron are provided in correspondence with said extremities (15a–15c) shaped like a cone or a truncated cone.

7. Furnace as in claim 1, characterized in that means (17, 18) to introduce said mixture of reducing gas are arranged in at least two or more reaction zones (12, 14) arranged distanced from each other in a vertical direction.

8. Furnace as in claim 7, characterized in that upstream of said introduction means (17, 18) mixing means (40) are provided suitable to obtain a mixture of reducing gas and at least a hydrocarbon ($CH_4$).

9. Furnace as in claim 7, characterized in that means (40, 41) to mix the reducing gas and hydrocarbons are arranged upstream of said introduction means (17, 18), in order to supply a mixture wherein the hydrocarbons are proportioned and controlled in an independent and controlled manner in the different reaction zones (12, 14).

10. Furnace as in claim 7, characterized in that upstream of said introduction means (17, 18) mixing means (40) are provided suitable to obtain a mixture of reducing gas with $O_2$ or air enriched with $O_2$ in order to raise the internal temperature to a value of between 800° C. and 1150° C.

11. Furnace as in claim 7, characterized in that means to control the delivery (65, 66) of the mixture of reducing gas are provided upstream of said introduction means (17, 18), said means to control the delivery (65, 66) being independent in the different reaction zones (12, 14).

12. Furnace as in claim 1, characterized in that each of said lower apertures (16a–16c) is provided with rotary valve means (47, 48, 49).

13. Furnace as in claim 1, characterized in that injection means (81) are provided to inject at least partly $CH_4$ into said furnace (10) in a zone between said reaction zone (14) and said discharge means (15).

14. Furnace as in claim 13, characterized in that said injection means (81) are arranged in a zone of intersection between said extremities (15a–15c) shaped like a cone or truncated cone.

* * * * *